(12) United States Patent
Maree

(10) Patent No.: US 6,419,834 B1
(45) Date of Patent: Jul. 16, 2002

(54) TREATMENT OF ACIDIC WATER CONTAINING DISSOLVED FERROUS CATIONS

(75) Inventor: Johannes Philippus Maree, Pretoria (ZA)

(73) Assignee: CSIR, Pretoria (ZA)

(*) Notice: Subject to any disclaimer, the term of this patent is extended or adjusted under 35 U.S.C. 154(b) by 0 days.

(21) Appl. No.: 09/446,100

(22) PCT Filed: Jun. 30, 1998

(86) PCT No.: PCT/GB98/01912

§ 371 (c)(1),
(2), (4) Date: Mar. 13, 2000

(87) PCT Pub. No.: WO99/01383

PCT Pub. Date: Jan. 14, 1999

(30) Foreign Application Priority Data

Jul. 2, 1997 (ZA) .................................. 97/5899

(51) Int. Cl.⁷ .................................................. C02F 1/52
(52) U.S. Cl. .................... 210/722; 210/713; 210/724; 210/738; 210/758
(58) Field of Search ................. 210/602, 620, 210/713, 722, 724, 738, 758

(56) References Cited

U.S. PATENT DOCUMENTS

| | | | |
|---|---|---|---|
| 2,829,964 A | | 4/1958 | Zimmerley et al. |
| 3,738,932 A | | 6/1973 | Kostenbader |
| 4,139,456 A | * | 2/1979 | Yabuuchi et al. |
| 4,465,597 A | | 8/1984 | Herman et al. |
| 5,427,691 A | | 6/1995 | Kuyucak et al. |

FOREIGN PATENT DOCUMENTS

| | | |
|---|---|---|
| CH | 590 791 | 8/1977 |
| JP | 60-084196 | 5/1985 |
| WO | WO 97/36829 | 10/1997 |

OTHER PUBLICATIONS

"Advanced Inorganic Chemistry" 4$^{th}$ Ed., (Cotton & Wilkinson), p. 754, John Wiley & Sons, 1980. ISBN 0–471–02775–8.

* cited by examiner

Primary Examiner—Betsey Morrison Hoey
(74) Attorney, Agent, or Firm—Klarquist Sparkman, LLP

(57) ABSTRACT

A water treatment process for raw water containing dissolved $Fe^{2+}$ and $H^+$ cations to reduce the $Fe^{2+}$ cation concentration therein involves oxidation of the $Fe^2$ cations to $Fe^{3+}$ cations with the formation in the water of solid $Fe(OH)_3$ from the $Fe^{3+}$ cations. The process comprises the steps of oxygenating the water and raising the pH of the water. The oxidation of the $Fe^{2+}$ cations and the fromation of the $Fe(OH)_3$ are carried out in the presence of suspended particulate material in the water, the particulate material being present in the water at a concentration of at least 5 g/l.

15 Claims, 1 Drawing Sheet

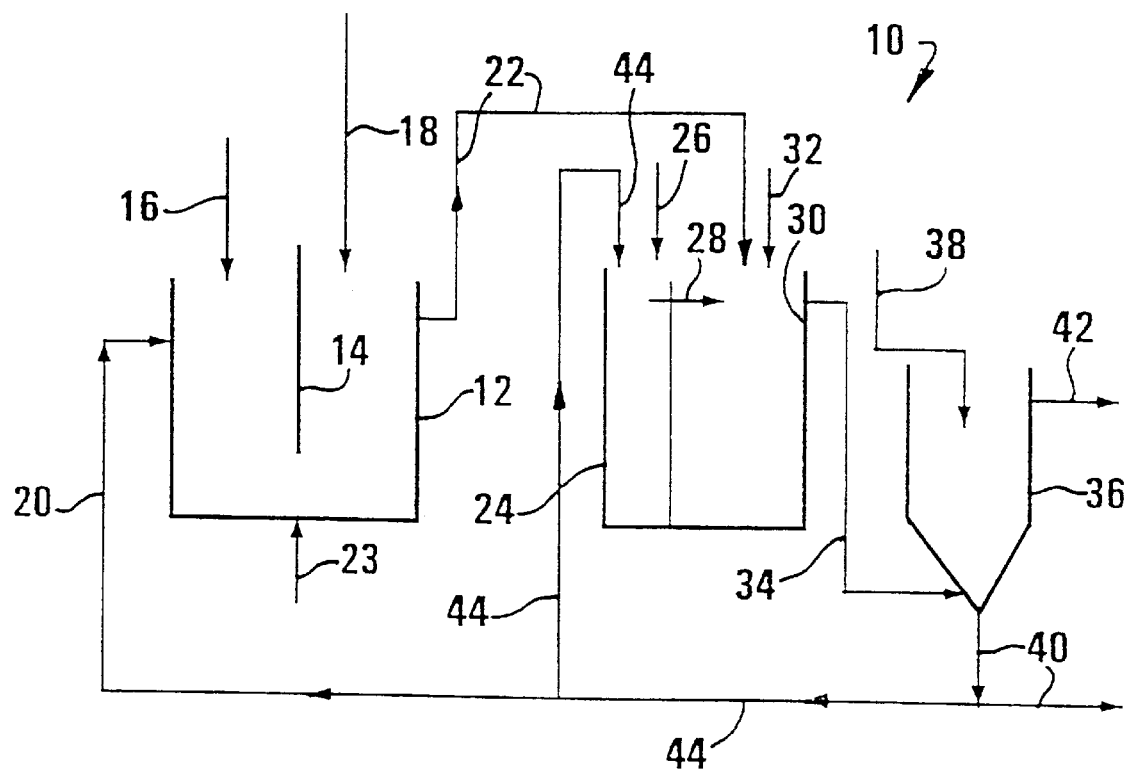

TREATMENT OF ACIDIC WATER CONTAINING DISSOLVED FERROUS CATIONS

THIS INVENTION relates to the treatment of water. More particularly, the invention relates to a process for the treatment of water which is acidic and contains dissolved ferrous ($Fe^{2+}$) cations, optionally in association with dissolved sulphate ($SO_4^{2-}$) anions.

The Applicant is aware of relevant prior art constituted by U.S. Pat. Nos. 5,427,691, 3,738,932, CH-A-590 791 and Patent Abstracts of Japan, Volume 009, No. 222 (1985) & Database WPI, AN 85-1501615 & JP-A-60 084196.

In U.S. Pat. No. 5,427,691 processes are disclosed for the treatment of acidic waters containing dissolved $Fe^{2+}$ cations by means of aeration to oxygenate the water and by raising the pH of the water in the presence of suspended particulate material, to oxidize the $Fe^{2+}$ cations to $Fe^{3+}$ cations and precipitate them as $Fe(OH)_3$. Lime is employed to raise the pH of the water to above 7 and the aeration takes place with the water at a pH above 7. A prior art process is also discussed in U.S. Pat. No. 5,427,691, in which limestone is used to remove $Fe^{3+}$ cations. To remove $Fe^{2+}$ cations using limestone, however, the $Fe^{2+}$ cations must first be oxidized to $Fe^{3+}$ cations, and doing so at acidic pH levels with air (dissolved oxygen) is described as 'almost impossible' because of the slow reaction rates.

In U.S. Pat. No. 3,738,932, similarly, a process is disclosed for the treatment of acidic waters containing dissolved $Fe^{2+}$ cations by means of aeration to oxygenate the water and by raising the pH in the presence of suspended particulate material, to oxidize the $Fe^{2+}$ cations and precipitate them as $Fe(OH)_3$. In this case, likewise, lime is used to raise the pH of the water to above 7 and the aeration takes place with the water at a pH above 7. No se of limestone or dolomite is described.

In CH-A-590 791 and Patent Abstracts of Japan supra, it is disclosed that it is known to use the oxidizing action of specific bacteria to oxidize $Fe^{2+}$ cations to $Fe^{3+}$ cations; and in said Patent Abstracts of Japan a two-stage process is disclosed whereby acidic sulphuric acid-containing waste water containing high concentrations of $Fe^{2}+$ cations is subjected, in a first stage, to a bacterial oxidation wherein the $Fe^{2+}$ cations are bacterially converted to $Fe^{3+}$ cations. Then, in a second stage, calcium carbonate is added to the water which has been subjected to the bacterial oxidizing treatment, to precipitate $Fe(OH)_3$.

According to the invention there is provided a process for the treatment of raw water containing dissolved $Fe^{2+}$ cations and dissolved $H^+$ cations so as to reduce the concentration of $Fe^{2}+$ cations therein, the process comprising the oxidation of dissolved $Fe^{2+}$ cations and the formation in the water of solid $Fe(OH)_3$ from said $Fe^{3+}$ cations, the process comprising the steps of:

oxygenating the water to achieve a dissolved oxygen concentration in the water of at least 0.1 mg/l, effective to oxidize the $Fe^{2+}$ cations to $Fe^{3+}$ cations; and raising the pH of the water, the oxidation of the $Fe^{2+}$ cations and the formation of the $Fe(OH)_3$ being carried out in the presence of suspended particulate material in the water, the particulate material being present in the water at an effective concentration of at least 5 g/l, the process being characterized in that, in combination, the raising of the pH acts partially to neutralize the water;

the raising of the pH is by dissolving limestone or dolomite in the water; and the dissolving of the limestone or dolomite in the water and the oxidation by dissolved oxygen of the $Fe^{2+}$ cations to $Fe^{3+}$ cations in the water take place together in the same body of partially neutralized water in the presence of the particulate material.

The process may comprise an agitation step whereby the water is agitated as it undergoes the oxygenating and the raising of its pH. Agitating the water may be by fluidizing it in a fluidized bed, fluidized eg by upward flow of air or oxygen through a body of the water containing the particulate matter, the particulate matter comprising particulate matter, such as calcium carbonate, added to neutralize the water, particulate matter precipitated from the water such as ferric hydroxide or gypsum, and/or slimes added to the water as a microorganism support. Instead, agitating the water may be by upward flow of the water through a fixed bed of particulate matter, or a packed bed of a support medium of the type described hereunder, conveniently at turbulent flow rates. Instead, the water may be mechanically agitated, so as to provide a fully-mixed or completely-mixed body of water, which again may be turbulent. Instead, the process can be carried out in a pipe or tube, along which turbulent flow takes place; and the water may be circulated through said beds or along said pipe or tube by means of a pump.

The water to be treated, i.e. the raw water, will typically have a $Fe^{2+}$ cation concentration of at least 100 mg/l, usually 150–5000 mg/l and more usually 200–4000 mg/l; and will typically have a pH of at most 7, usually 1–6 and more usually 2–5. Often, the water to be treated will also contain $SO_4^{2-}$ ions at a concentration of at least 200 mg/l, usually 200–25 000 mg/l, and more usually 1000–10 000 mg/l. This water will typically have an Acidity, i.e. an $HCO^-_3$ acidity, expressed as mg/l of $CaCO_3$, of 200–30 000, usually 400–25 000 and more usually 1000–10 000.

Oxygenating the water may be such as to achieve a dissolved oxygen concentration in the water of at least 0.5–8 mg/l, the suspended solid material having a particle size distribution whereby at least 50% by mass thereof has a particle size of less than 500 μm, the particulate material being present in the water at a concentration of at least 10 g/l, the raw water having a dissolved $Fe^{2+}$ cation concentration of more than 100 mg/l, and the process acting to to decrease the dissolved $Fe^{2+}$ cation concentration to less than 100 mg/l.

More particularly, the raw water may contain dissolved $SO_4^{2-}$ anions, the process including the biological oxidation of dissolved $Fe^{2+}$ cations to $Fe^{3+}$ cations and the process being carried out at a temperature of 0–90° C., preferably 5–40° C. In this case the raw water may have a dissolved $SO_4^{2-}$ anion concentration of at least 200 mg/l, the biological oxidation being carried out by microorganisms selected from

*Ferrobacillus ferrooxidans;*

*Ferrobacillus thiooxidans;*

*Thiobacillus thiooxidans;* and mixtures of any two or more thereof.

The microorganisms may be supported on a support medium, to increase the concentration of microorganisms in the agitated water. While the support medium may be of metal or synthetic plastics material, such as rings, plates (which may be corrugated) and superimposed corrugated plates such as those available in South Africa under the Trade Mark TERBO PLASTIC, to provide a surface area for microorganism growth of at least 10 $m^2$ of support medium area/$m^3$ of agitated water, preferably 100–1000 $m^2/m^3$ and more preferably 200–500 $m^2/m^3$, the support medium instead is conveniently a packed or suspended particulate material, in particular a finely divided particulate material, such as a slimes or sludge material or sediment added to the agitated water either continuously, or at the start of the process to be progressively supplanted by solids produced by the process as the process proceeds. The particulate material present in the agitated water may have a particle size of at most 500 $\mu$m, preferably 5–200 $\mu$m, and more preferably 10–100 $\mu$m. This particulate material may be present at a concentration of 10–500 g/l, preferably 50–200 g/l; and the particulate material may provide a particle surface area in the agitated water of at least 100 m$^2$/m$^3$ of agitated water, preferably 100–10 000 000 m$^2$/m$^3$. Examples of suitable particulate materials for initial employment are waste coal fines and gypsum (when sulphate is precipitated by calcium salts addition as described hereunder), and will be progressively supplanted by precipitated Fe(OH)$_3$ optionally admixed with gypsum (CaSO$_4$.2H$_2$O) if calcium salts (as described hereunder) are used for the neutralization, and if the water to be treated contains SO$_4^{2-}$ anions. If desired, both a support medium in the form of rings or plates, as described above, can be used, and a particulate support medium, such media both acting to provide an increased surface area for growth of microorganisms.

The raw water may have a pH of at most 7, the raw water having an Acidity, expressed as mg/l of CaCO$_3$ dissolved therein, of at least 200, and the suspended particulate material providing a particle surface area in the water of at least 100 m$^2$/m$^3$ water. When the raw water contains dissolved SO$_4^{2-}$ anions, raising the pH of the water may comprise adding CaCO$_3$ thereto to cause the formation of solid CaSO$_4$.2H$_2$O in the water, the CaSO$_4$.2H$_2$O being allowed to precipitate from the water. In this case, the oxidation of dissolved Fe$^{2+}$ cations to Fe$^{3+}$ cations, the addition of CaCO$_3$ to the water and the precipitation of CaSO$_4$.2H$_2$O from the water will take place together in the same body of water.

The process may be carried out at ambient temperatures such as the temperature of 0–90° C. as mentioned above, preferably 5–40° C. and more preferably 15–30° C. While the process can in principle be carried out on a batch basis, it is conveniently carried out on a continuous basis; and it may be carried out in a single stage or in a plurality of stages arranged in parallel and/or series. When the process is in operation, any biological oxidation of Fe$^{2+}$ to Fe$^{3+}$ tends to cause a drop in pH, so that neutralization must be effected continuously or intermittently, so as to keep the pH up to a desired level of at least 3, eg above 4, preferably above 5 and more preferably above 6. Typically the water will be treated for an average period or reaction time of at least 1 minute, usually 20–1440 minutes and more preferably 30–480 minutes, which will be its average residence time in a single stage when a single stage is used or its total residence time in a plurality of stages, when a plurality of stages is used.

At least partially neutralizing the water may be by adding a suitable base or alkali, optionally in particulate form, thereto, examples of suitable alkalis being CaCO$_3$, Ca(OH)$_2$, CaO and NaOH, in particular limestone or calcium carbonate (CaCO$_3$), but not excluding dolomite or waste alkalis obtainable in mixed form as steel industry waste products. The alkali added preferably has a particle size of at most 500 $\mu$m, more preferably at most 100 $\mu$m and conveniently as small as practicable, bearing economic considerations in mind.

Oxygenating the water may be by feeding oxygen to the water, and this may be by bubbling oxygen or conveniently air through the water. The feed rate may be such as to achieve a preferred dissolved oxygen content in the water of 1–5 mg/l.

In accordance with the invention water may be treated continuously by the process and may pass on to a settling or sedimentation stage where metal hydroxides or oxides, in particular Fe(OH)$_3$, optionally containing CaSO$_4$.2H$_2$O, will be precipitated therefrom, and slimes or sediment from this sedimentation stage may be recirculated to the process to give the particulate material which provides the surface area which promotes the oxidation of Fe$^{2+}$ to Fe$^{3+}$. This particulate material can also support the microorganisms which carry out the biological oxidation of the Fe$^{2+}$ to Fe$^{3+}$.

In terms of a variation of the process, treated water flowing from the oxidation of Fe$^{2+}$ to Fe$^{3+}$ to the sedimentation stage may be used to dispose of acidic waste water with a pH of 2–6. Such acidic waste water may have a pH of 3–4, and an Fe$^{2+}$ cation concentration of at least 100 mg/l, usually 100–2000 mg/l, and more usually 100–800 mg/l; it may have an Acidity, expressed as mg/l of CaCO$_3$ of at least 200, usually 200–4000 and more usually 200–1600; and it may have a SO$_4^{2-}$ anion concentration of at least 200 mg/l, usually 200–4000 mg/l and more usually 200–2600 mg/l. This can be effected by mixing the water issuing from the Fe$^{2+}$ oxidation stage with the acidic waste water and dosing it with a strong alkali such as lime (CaOH) to raise its pH to a value of 6–9, eg about 7, eg in an aeration tank. This may be done by first adding the strong alkali in a conditioning tank to water or sludge recirculated from the sedimentation stage, to raise its pH to 11–12, this water, at a pH of 11–12, being used in the aeration stage to raise the pH, after which, in the sedimentation stage, a suitable flocculant may be used to promote settling of the Fe(OH)$_3$ and optionally of the CaSO$_4$.2H$_2$O.

Accordingly, after the formation of the Fe(OH)$_3$, the water may be subjected to a sedimentation step to settle suspended solids therefrom. In particular, the water may be treated on a continuous basis, the sedimentation step being carried out separately from the oxygenating of the water and separately from the raising of the pH thereof, solids settled by the sedimentation step being recirculated and the oxidation of the Fe$^{2+}$ cations taking place in the presence of the recirculated solids. In this case, the oxygenation of the water may include an aeration step, separate from the step of raising the pH of the water, solids settled by the sedimentation step being recirculated to the pH-raising step and to the aeration step.

The oxidation reactions which take place according to the process can be expressed by:

$$2Fe^{2+} + \tfrac{1}{2}O_2 + 2H^+ \rightarrow 2Fe^{3+} + H_2O;$$

and $$2Fe^{3+} + 6H_2O \rightarrow 2Fe(OH)_3 \downarrow + 6H^+,$$

and, when SO$_4^{2-}$ is present in the water to be treated by the biological oxidation and a calcium salt is used for neutralization of that water, gypsum is produced according to the chemical reaction:

$$2H_2O + Ca^{2+} + SO_4^{2-} \rightarrow CaSO_4.2H_2O \downarrow.$$

When weakly acid waste water of a pH of above 4 is treated according to the process of the invention, the treated water may have, in combination, a pH of 5.0 or more, an Fe$^{2+}$ cation content of 100 mg/l or less, an acidity as mg/l of CaCO$_3$ of 500 or less, and a SO$_4^{2-}$ anion content of 4000 mg/ or less. When the process is used also to dispose of highly acid waste water with a pH of less than 4, the treated water may have a pH of 4.0 or more, an Fe$^{2+}$ cation content of 100 mg/l or less, an Acidity as mg/l of CaCO$_3$ of 1000 or less, and a $SO_4^{2-}$ anion content of 4000 mg/l or less, typically less than 3000 mg/l.

The invention will now be described, by way of example, with reference to the accompanying diagrammatic drawing, in which the single Figure is a schematic flow diagram of an installation suitable for carrying out the process of the present invention.

In the drawing, reference numeral 10 generally designates an installation for carrying out the process of the present invention. The installation comprises a fully-mixed tank 12 provided with a mechanical agitator 14, a feed line 16 for water to be treated, a limestone powder feed line 18, a slimes or sludge recirculation feed line 20, and a treated water discharge flow line 22 and an air feed line 23.

Flow line 22 feeds into an aerator tank 30, and a conditioning tank 24 provided with a lime feed line 26 and provided with a discharge flow line 28 feeds into the aeration tank 30, which is provided with an acid waste water feed line 32 and an outlet flow line 34.

Flow line 34 leads to a sedimentation tank 36 provided with a flocculant feed line 38, a sludge or sediment outlet flow line 40 and a product water outlet flow line 42. A branch line 44 leaves line 40 and feeds respectively into line 20 and into tank 24.

In accordance with the process of the invention water to be treated is fed at a temperature of 18° C. and at a pH of 2.5, with a $Fe^{2+}$ content of 3000 mg/l, an acidity of 10 000 mg/l as $CaCO_3$ and a $SO_4^{2-}$ content of 12 000 mg/l at a rate of 80 000 l/h along line 16 into tank 12. Powdered limestone of a particle size of less than 100 $\mu$m is fed at a rate of 800 kg/h along flow line 18 into tank 12 which is kept fully mixed by agitator 14. Air is fed to tank 12 along line 23. Sludge is fed along line 20 to tank 12. The limestone feed along line 18 is at a slight stoichiometric excess (20%) above that required to react with the sulphate ions and to achieve the desired pH rise.

The tank 12 contains *Ferrobacillus ferrooxidans* microorganisms and acts as a biological oxidation stage for the biological metabolization and oxidation of $Fe^{2+}$ to $Fe^{3+}$ according to the reaction:

$$2Fe^{2+} + \tfrac{1}{2}O_2 + 2H^+ \rightarrow 2Fe^{3+} + H_2O.$$

The respective feed rates along lines 16, 18, 20 and 22 are selected to provide water in the tank 12 with a pH of 5.0 at a temperature of 18° C., with a sludge content of at least 50 g/l and a dissolved oxygen content of 3 mg/l, and to provide the water in the tank 12 with an average or mean residence time in the tank 12 of 2 hours. The water leaves the tank 12 with a $Fe^{2+}$ cation content of at most 50 mg/l, an acidity of at most 100 mg/l $CaCO_3$ and a $SO_4^{2-}$ content of at most 2000 mg/l.

Water leaves the tank 12 along line 22 to tank 30 which acts as a aeration stage where weakly acid water is added along line 32. Lime added along line 26 to tank 24 is used to raise the pH of water in tank 24 to a value of 12. This water is water recirculated with sludge as a slurry along line 44 from the sedimentation stage 36. This slurry at pH 12 then leaves the tank 24 along line 28 to tank 30 which acts as an aeration tank, having an air supply (not shown) and to which said weakly acid waste water at a pH of 2.4 is added along line 32 at a rate such that a pH of at least 6 is obtained in the water in the tank 30. Mean residence times in the tanks 24 and 30 are respectively 10 minutes and 20 minutes, and the aeration in the tank 30 is such as to achieve a dissolved oxygen content in the water therein of at least 0.5 mg/l. Temperatures in the tanks 24 and 30 are respectively 18° C. and 18° C.

Water leaves tank 30 along line 34 to tank 36 which acts as a sedimentation stage. A flocculant eg comprising MAGNAFLOC 333 is fed along line 38 to tank 36 at a rate of 2–3 mg of. flocculant/l of water fed along line 34 to tank 36. Sedimentation of flocculated $Fe(OH)_3$ and $CaSO_4$ precipitates takes place at 18° C. in tank 36, the precipitates having been respectively formed according to the chemical reactions:

$$Fe^{3+} + 3H_2O \rightarrow Fe(OH)_3\downarrow + 3H^+;$$

and $$2H_2O + Ca^{2+} + SO_4^{2-} \rightarrow CaSO_4.2H_2O\downarrow.$$

Product water at a pH of about 7, having a $Fe^{2+}/Fe^{3+}$ content of at most 100 mg/l, an acidity of at most 200 mg/l $CaCO_3$, and having a sulphate content of at most 3000 mg/l leaves tank 36 along line 42 and sludge leaves it along line 40 to waste. Sludge is recirculated from line 40 via lines 44 and 20 to tank 12 to provide a microorganism support medium for the microorganisms in the tank 12; and sludge is recirculated via line 44 to the tank 24 as described above.

Usually, a sedimentation stage (not shown) will be provided in flow line 22, this sedimentation stage having a sludge outlet into tank 12 and a water outlet along line 22 to the tank 30.

It is to be noted that variations, in accordance with the present invention, of the process illustrated by the specific flow diagram shown in the drawing are possible. Thus, in particular, the tanks 24 and 30 can be omitted and line 22 can feed downwardly directly into tank 36. In this case line 44 will not feed into tank 24 but will only feed into line 20 and thence into tank 12, lines 26 and 32 also being omitted. Furthermore, tank 12 may, instead of being a fully-mixed tank provided with an agitator, be a packed tower or a fluidized bed.

It is an advantage of the invention, as described with reference to the drawing, that it provides an efficient and effective process for disposing of acid waters containing dissolved $Fe^{2+}$ cations and $SO_4^{2-}$ anions, while simultaneously disposing of highly acid waste water with a pH as low as 2.5. It should also be noted that, if desired, the biological $Fe^{2+}$ oxidation in tank 12 can be operated on a batch basis, two suitable equalization—or surge tanks (not shown) being provided respectively before tank 12, and after tank 12 and before tank 30, from which water received in batches from tank 12 can be fed continuously to tank 30.

More particularly, it is an advantage of the invention that a high density sludge having a density of 500–600 g/l or more, is obtainable in the tank 36, particularly if the level of dissolved $CaSO_4$ in the water exceeds the saturation limit of $CaSO_4$ in the water at the temperature in question. Furthermore, with increases in pH of the water, metal ions other than those of $Fe^{2+}$ can, if they are present in the water, be removed from the water so as to reduce their concentration therein if not eliminate them from the water.

Thus, if $CaCO_3$ is used to raise the pH of the water, reduction in the concentration of any Mn ions in the raw water can take place in response to oxidation of $Mn^{2+}$ ions to $Mn^{4+}$ ions by aeration in the presence of $MnO_2$ in the recirculated sludge. $MnO_2$ is thus formed which can then form part of the eventual precipitate. Similarly, at least partial reduction of the concentrations of any As, Cd, Co, Cu and Zn ions in the raw water can take place, in response to the addition of $CaCO_3$ to the water, being precipitated respectively as $As_2O_3$, $Cd(OH)_2$, $Co(OH)_2$, $Cu(OH)_2$, $Pb(OH)_2$ and $Zn(OH)_2$. When lime ($Ca(OH)_2$) is used to raise the pH of the water, substantially greater reductions in the concentrations of the metals in question can in principle be achieved. The Applicant understands that, typically, precipitation will take place when the pH is increased to a value of about 7, exceptions being the precipitation of $Zn(OH)_2$ which can take place at a pH of about 8, and the precipitation of $MnO_2$ which can take place at a pH of about 9.8. It is further to be noted, in particular, that whether $CaCO_3$ or $Ca(OH)_2$ is used to raise the pH, an at least partial reduction of the concentration of any Se ions in the raw water can take place by co-precipitation during gypsum crystallization, when the raw water contains $SO_{4-}$ anions.

What is claimed is:

1. A process for the treatment of raw water containing dissolved $Fe^{2+}$ cations and dissolved $H^+$ cations so as to reduce the concentration of $Fe^{2+}$ cations therein, the process comprising the oxidation of dissolved $Fe^{2+}$ cations in the water to $Fe^{3+}$ cations and the formation in the water of solid $Fe(OH)_3$ from said $Fe^{3+}$ cations, the process comprising the steps of:

oxygenating the water; and raising the pH of the water to a value below 7, the oxidation of $Fe^{2+}$ cations and the formation of the $Fe(OH)_3$ being carried out in the presence of suspended particulate material in the water, the particulate material being present in the water at a concentration of at least 5 g/l, wherein raising the pH of the water comprises adding $CaCO_3$ thereto.

2. A process as claimed in claim 1, which comprises an agitation step whereby the water is agitated as it undergoes the oxygenation and the raising of its pH.

3. A process as claimed in claim 1, in which oxygenating the water is such as to achieve a dissolved oxygen concentration in the water of at least 0.1 mg/l, the suspended solid material having a particle size distribution whereby at least 50% by mass thereof has a particle size of less than 500 μm, the particulate material being present in the water at a concentration of at least 10 g/l, the raw water having a dissolved $Fe^{2+}$ cation concentration of more than 100 mg/l, and the process acting to decrease the dissolved $Fe^{2+}$ cation concentration to less than 100 mg/l.

4. A process as claimed in claim 1, in which the raw water contains dissolved $So_4^{2-}$ anions, the process including the biological oxidation of dissolved $Fe^{2+}$ cations to $Fe^{3+}$ cations and the process being carried out at a temperature of 5–40° C.

5. A process as claimed in claim 4, in which the raw water has a dissolved $SO_4^{2-}$ anion concentration of at least 200 mg/l, the biological oxidation being carried out by microorganisms selected from

*Ferrobacillus ferrooxidans;*

*Ferrobacillus thiooxidans;*

*Thiobacillus thiooxidans;* and mixtures of any two or more thereof.

6. A process as claimed in claim 1, in which the raw water has a pH of at most 7, the raw water having an Acidity, expressed as mg/l of $CaCO_3$ dissolved therein, of at least 200, and the suspended particulate material providing a surface area in the water of at least 100 m²/m³ water.

7. A process as claimed in claim 1, in which the raw water contains dissolved $SO_4^{2-}$ anions, adding the $CaCO_3$ thereto being by adding an alkali selected from the group consisting of limestone, dolomite and mixtures thereof thereto to cause the formation of solid $CaSO_4.2H_2O$ in the water, the $CaSO_4.2H_2O$ being allowed to precipitate from the water.

8. A process as claimed in claim 7, in which the oxidation of dissolved $Fe^{2+}$ cations to $Fe^{3+}$ cations, the addition of the $CaCO_3$ to the water, and the precipitation of the $CaSO_4$ from the water take place together in the same body of water.

9. A process as claimed in claim 1, in which, after the formation of the $Fe(OH)_3$, the water is subjected to a sedimentation step to settle suspended solids therefrom.

10. A process as claimed in claim 9, in which the water is treated on a continuous basis, the sedimentation step being carried out separately from the oxygenating of the water and separately from the raising of the pH thereof, solids settled by the sedimentation step being recirculated and the oxidation of the $Fe^{2+}$ cations taking place in the presence of the recirculated solids.

11. A process as claimed in claim 9, in which the oxygenation of the water includes an aeration step, separate from the step of raising the pH of the water, solids settled by the sedimentation step being recirculated to the pH-raising step and to the aeration step.

12. A process for the treatment of raw water containing dissolved $Fe^{2+}$ cations and dissolved $H^+$ cations so as to reduce the concentration of $Fe^{2+}$ cations therein, the process comprising the oxidation of dissolved $Fe^{2+}$ cations in the water to $Fe^{3+}$ cations and the formation in the water of solid $Fe(OH)_3$ from said $Fe^{3+}$ cations, the process comprising the steps of:

oxygenating the water; and raising the pH of the water, the oxidation of $Fe^{2+}$ cations and the formation of the $Fe(OH)_3$ being carried out in the presence of suspended particulate material in the water, the particulate material being present in the water at a concentration of at least 5 g/l, oxygenating the water being such as to achieve a dissolved oxygen concentration in the water of at least 0.1 mg/l, the suspended solid material having a particle size distribution whereby at least 50% by mass thereof has a particle size of less than 500 μm, the particulate material being present in the water at a concentration of at least 10 g/l the water having a dissolved $Fe^{2+}$ cation concentration of more than 100 g/l, and the process acting to decrease the dissolved $Fe^{2+}$ cation concentration to less than 100 mg/l.

13. A process for the treatment of raw water containing dissolved $Fe^{2+}$ cations and dissolved $H^+$ cations so as to reduce the concentration of $Fe^{2+}$ cations therein, the process comprising the oxidation of dissolved $Fe^{2+}$ cations in the water to $Fe^{3+}$ cations and the formation in the water of solid $Fe(OH)_3$ from said $Fe^{3+}$ cations, the process comprising the steps of:

oxygenating the water; and raising the pH of the water, the oxidation of $Fe^{2+}$ cations and the formation of the $Fe(OH)_3$ being carried out in the presence of suspended particulate material in the water, the particulate material being present in the water at a concentration of at least 5 g/l, the raw water containing dissolved $SO_4^{2-}$ anions, the process including the biological oxidation of dissolved $Fe^{2+}$ cations to $Fe^{3+}$ cations and the process being carried out at a temperature of 5–40° C.

14. A process for the treatment of raw water containing dissolved $Fe^{2+}$ cations and dissolved $H^+$ cations so as to reduce the concentration of $Fe^{2+}$ cations therein, the process comprising the oxidation of dissolved $Fe^{2+}$ cations in the water to $Fe^{3+}$ cations and the formation in the water of solid $Fe(OH)_3$ from said $Fe^{3+}$ cations, the process comprising the steps of:

oxygenating the water; and raising the pH of the water, the oxidation of $Fe^{2+}$ cations and the formation of the $Fe(OH)_3$ being carried out in the presence of suspended particulate material in the water, the particulate material being present in the water at a concentration of at least 5 g/l, the raw water having a pH of at most 7, the raw water having an Acidity, expressed as mg/l of $CaCO_3$ dissolved therein, of at least 200, and the suspended particulate material providing a surface area in the water of at least 100 $m^2/m^3$ water.

15. A process for the treatment of raw water containing dissolved $Fe^{2+}$ cations and dissolved $H^+$ cations so as to reduce the concentration of $Fe^{2+}$ cations therein, the process comprising the oxidation of dissolved $Fe^{2+}$ cations in the water to $Fe^{3+}$ cations and the formation in the water of solid $Fe(OH)_3$ from said $Fe^{3+}$ cations, the process comprising the steps of:

oxygenating the water to achieve a dissolved oxygen concentration in the water of at least 0.1 mg/l; and raising the pH of the water, the oxidation of $Fe^{2+}$ cations and the formation of the $Fe(OH)_3$ being carried out in the presence of suspended particulate material in the water, the particulate material being present in the water at a concentration of at least 5 g/l, in which process, in combination, the raising of the pH acts partially to neutralize the water;

the raising of the pH is by dissolving limestone or dolomite in the water; and the dissolving of the limestone or dolomite in the water and the oxidation by dissolved oxygen of the $Fe^{2+}$ cations to $Fe^{3+}$ cations in the water take place together in the same body of partially neutralized water in the presence of the particulate material.

\* \* \* \* \*